Patented Apr. 7, 1925.

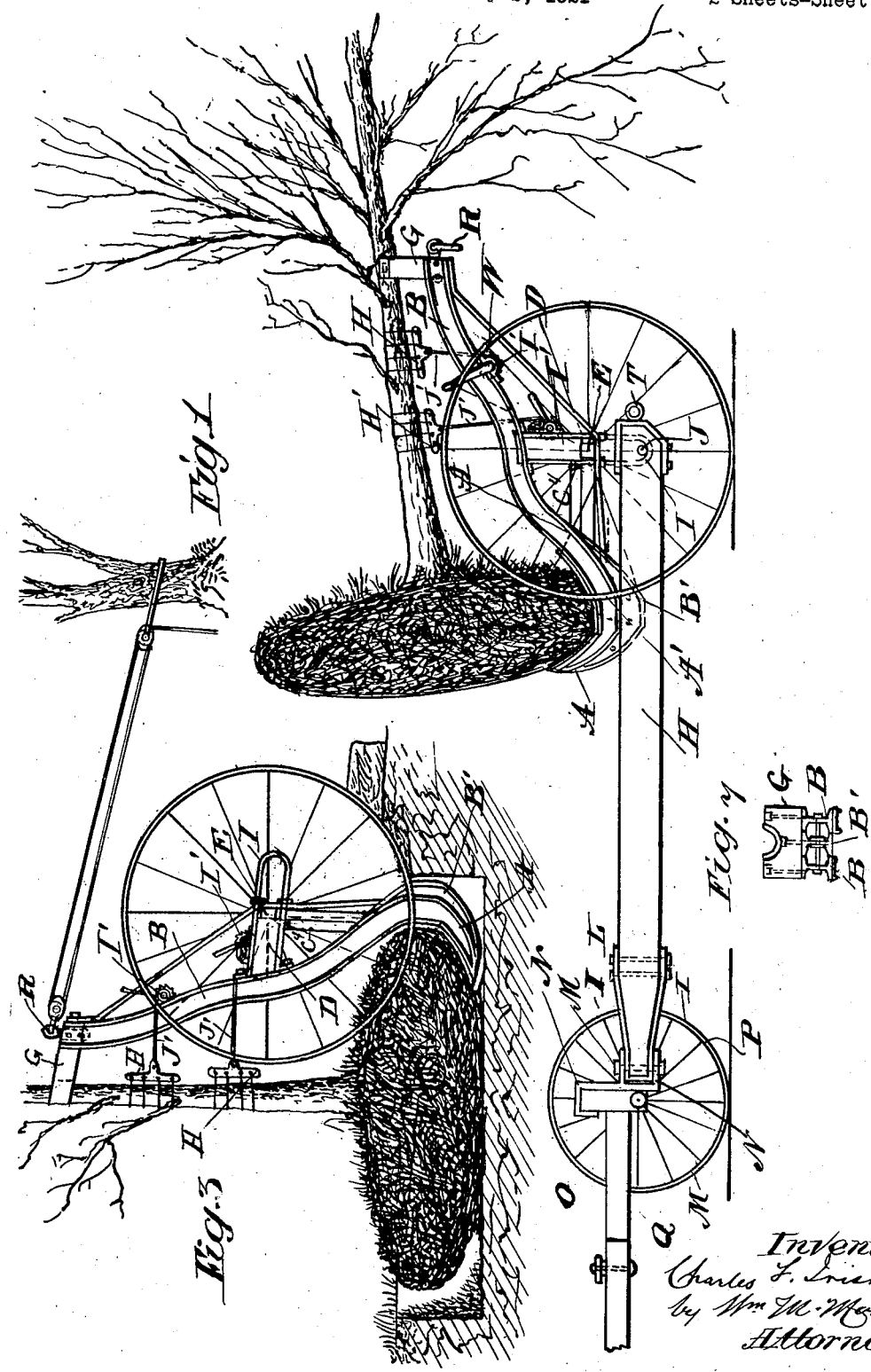

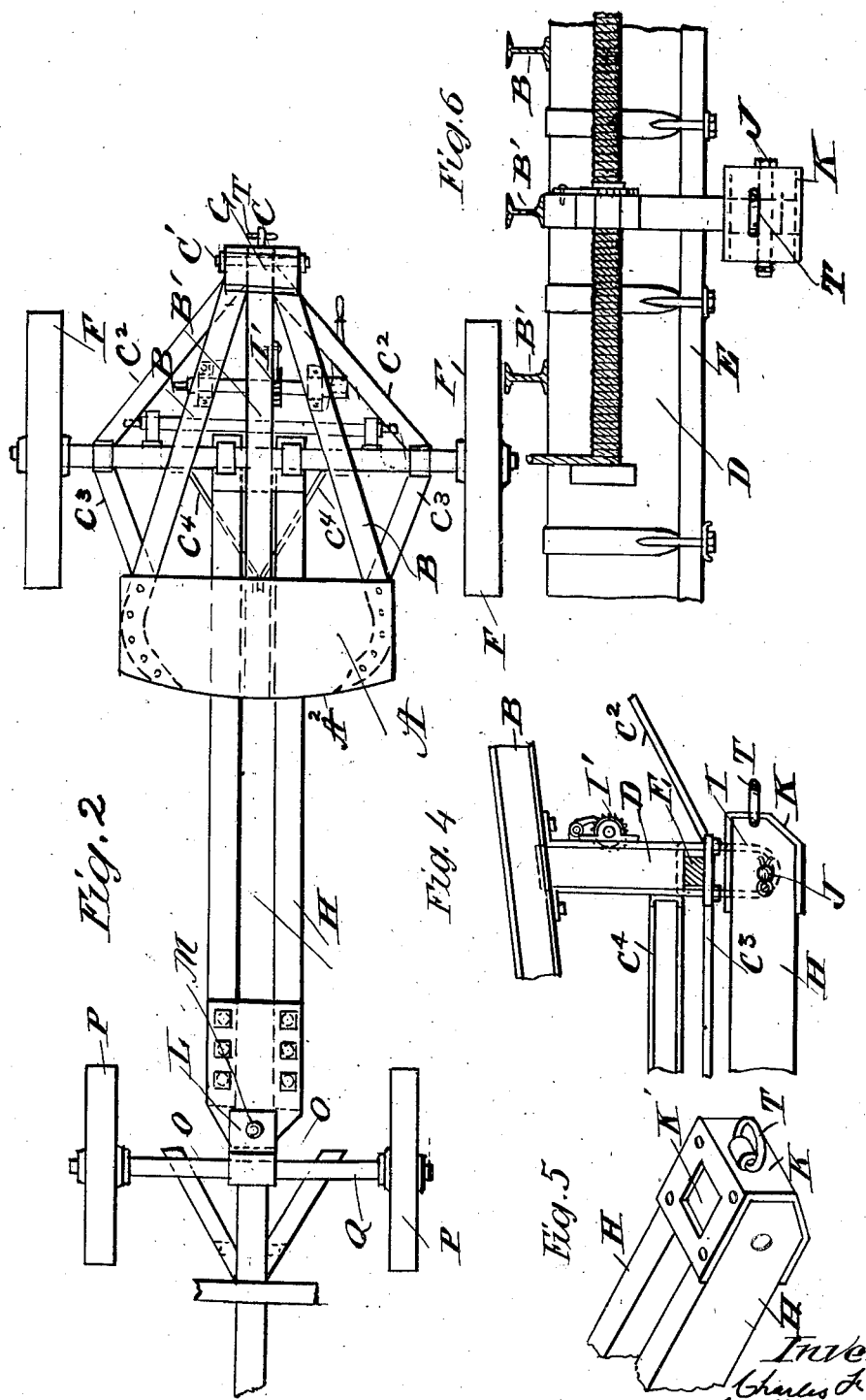

1,532,244

UNITED STATES PATENT OFFICE.

CHARLES F. IRISH, OF BRATENAHL, OHIO.

TREE-TRANSPLANTING DEVICE.

Application filed May 2, 1921. Serial No. 466,365.

*To all whom it may concern:*

Be it know that I, CHARLES F. IRISH, a citizen of the United States, and resident of the village of Bratenahl, in the county of Cuyahoga and State of Ohio, have invented certain new and useful Improvements in Tree-Transplanting Devices, of which I hereby declare the following to be a full, clear, and exact description, such as will enable others skilled in the art to which it appertains, to make and use the same.

This invention relates to a machine or apparatus for removing and transporting trees, for transplanting or other purposes, and it is capable of use on trees of considerable size.

The principal object of the invention is to provide a machine by means of which the tree may be excavated or lifted, and thereafter transported to its new location, and for this purpose there is employed a combined excavating cradle and carrier provided with power means for its operation.

A further object of the invention is to provide improved means for mounting the tree on the carrier and holding the same in position thereon.

A further object of the invention is to provide an improved connection between a rear truck on which the carrier is mounted and a front truck and reach, in such manner as to produce a positive alinement between the front and rear trucks, at the same time preventing any side slip of the cradle.

A further object of the invention is to provide a lifter and carrier of such size and shape that the root mass will, when the lifting force is applied, settle into position in the cradle where it will be retained largely by its own weight.

Other objects and advantages will be apparent from the following description.

In the accompanying drawings, Fig. 1 is a side elevation of the complete device with a tree thereon in position for transportation. Fig. 2 is a top plan of the machine. Fig. 3 is a side elevation of the rear truck and carrier illustrating its position when the tree is about to be lifted, or transplanted in its new position. Fig. 4 is a detail in longitudinal section showing the coupling between the reach and the rear truck. Fig. 5 is a perspective of the rear end of the reach. Fig. 6 is a rear elevation of the bolster and axle of the rear truck, and the reach connected thereto. Fig. 7 is a detail of the saddle at the upper end of the cradle.

The carrier includes or comprises a concave cradle A, made of sheet metal of sufficient strength and size to support the root mass of the tree, wherefore it has considerable width transversely of the machine and is dished so that its lower or forward edge $A^2$ may be entered under the root mass and so acts to excavate the same, after which the mass will settle into the concavity of the cradle and will be retained therein largely by its own weight. This cradle is mounted upon the lower ends of the two side beams B and a middle beam B', the former being spread or diverging to fit under the opposite ends of the cradle. The upper or rear ends of the beams are bolted together as indicated at C', and these beams as a whole form a lever which is mounted between its ends on a bolster D which is clamped upon an axle E the ends of which receive the wheels F, whereby the carrier can be tilted to any required angle, upon the axle as a pivot. Braces $C^2$, $C^3$, and $C^4$ connect the bolster and the beams of the carrier, to stiffen and strengthen the same.

The upper ends of the beams support a saddle G for engaging and supporting the trunk of the tree at a considerable distance above the ground, and the tree is clamped on the carrier by means of slings H extending around the trunk and connected by ropes J' to winding drums I', one of which is mounted upon the beams B and the other of which is mounted upon the rear side of the bolster D, whereby the tree can be clamped in position with the root mass on the cradle and the trunk against the saddle. The carrier is so located that when in horizontal position the weight will be substantially balanced upon the axle, with both the roots and the branches above the ground, and the position can be shifted without the use of great power.

The rear truck is detachably connected to the rear end of a double reach H which is suspended in a strap I under the axle E by means of a removable pin J extending thru holes in the reach H and thru the loop of the strap, and when the reach is connected to the rear truck the middle beam B' of the carrier rests between the two members of the reach, shown in Fig. 1, whereby side movement or swing is prevented and the reach is held in proper alinement with the rear truck, the loop of the strap I depending into a hole K' in the connecting plate K at the rear end of the reach. This plate is also provided with a ring T by means of which the reach can be pulled rearwardly if necessary. The joint or connection thus produced with the rear end of the reach and the rear truck thus holds the parts rigid in proper position during the transportation of the tree.

The front ends of the reach members are connected by a plate L thru which the king pin M is inserted to couple the same with a plate N on the front bolster O supported by the front axle Q and front wheels P.

An eye R is fixed to the upper or rear end of the beam B', to which a tackle may be connected, shown in Fig. 3, for the application of power to the lever.

In operation, an excavation is first made around the root mass of the tree to be moved and the rear truck is then placed at the edge of the excavation, with the cradle inserted in said excavation and under the root mass, and the tree trunk is then clamped against the saddle. By means of the tackle the carrier is then rocked on the rear axle as a pivot, causing the cradle to enter under the root mass and finally lifting the same and the tree free from the ground, and when in substantially horizontal position the front truck and reach are backed into place and the pin J is inserted to couple the reach and the rear truck, the middle beam B' fitting, as stated, between the two members of the reach, in which position the tree can be transported. To deposit the tree in its new location the reverse operation is performed, that is, the rear truck is drawn to the edge of the excavation made to receive the tree, the front truck and reach are detached and removed, and the carrier is then rocked to lower the tree into the excavation.

It will be noticed that the cradle A is so disposed and shaped that it serves not only to carry the tree but also to apply power under the root mass and thereby lift the same when the carrier is rocked on its pivot. This permits great power to be applied, in a simple manner, and the main strain is not on the tree trunk but is underneath the root mass so that the tree is lifted rather than pulled up, which avoids breaking up of the root mass and disintegration of the earth around the same. It will be recognized that in such transplanting operations it is desirable to retain the soil around the roots in its original position so far as possible.

The invention is not limited to the particular form and construction shown, but various modifications may be made within the scope of the following claims.

I claim:

1. The combination, with a truck, of a concave tree excavator and carrier mounted on said truck, said excavator having a projecting front edge to engage under the root mass of the tree, a lever connected to and extending from said excavator and carrier, and means for rocking the lever.

2. The combination, with a truck, of a concave tree excavator and carrier mounted on said truck, the excavator being dished longitudinally to form a cradle into which the root mass of the tree will settle when the tree is excavated, a lever connected to said excavator and carrier, and means for rocking the lever.

3. The combination stated in claim 2, the front edge of the excavator extending forwardly to engage under the root mass of the tree when the latter is in vertical position.

4. The combination stated in claim 2, the excavator being dished both transversely and longitudinally to form a cradle engaging the root mass at the sides and also the bottom thereof.

5. The combination set forth in claim 2, the lever comprising a plurality of beams the lower ends of which are curved outwardly to engage under the root mass of the tree.

6. The combination stated in claim 2, the lever comprising a plurality of beams the lower ends of which are curved to fit under the concavity of the excavator.

7. The combination stated in claim 2, the edge of the excavator being presented at an angle to cut under the root mass of the tree when the lever is rocked.

8. The combination stated in claim 2, the excavator comprising a dished or concave plate with a front cutting edge presented at an angle to enter under the root mass of the tree.

9. In a device for raising and transporting trees, a concave cradle member having a cutting edge adapted to be entered underneath the roots of a tree and the ball of earth enclosing the same, an extended lever secured to said member, a saddle for supporting the stem of the tree, a bolster intermediate of the ends of said lever, and an axle and transporting members mounted thereon.

10. In a tree removing device, in combination, a cradle, central and side supporting beams extending rearwardly from said cradle, said beams extending underneath said cradle and united at their rear ends, a rear truck secured to said beams, a double reach between the members of which said central beam of said cradle is adapted to fit, and a front truck connected to said reach.

11. A concave cradle for the purpose described, comprising, a concave sheet metal body having a forwardly projecting front edge to adapt it to pass under and retain the roots of a tree and the enclosing ball of earth thereon, and supporting beams therefor, said beams passing under the sides and middle of said cradle.

In testimony whereof, I hereunto set my hand this 22nd day of January, 1920.

CHARLES F. IRISH.

In presence of:
S. A. WILLIAMSON,
WM. M. MONROE.